(12) United States Patent
Ishigaki et al.

(10) Patent No.: US 11,993,220 B2
(45) Date of Patent: May 28, 2024

(54) DRIVERSEAT AIRBAG DEVICE

(71) Applicant: Autoliv Development AB, Vargarda (SE)

(72) Inventors: Ryota Ishigaki, Kanagawa (JP); Yutaka Hirota, Kanagawa (JP); Christopher Banatin, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/042,923

(22) PCT Filed: Jul. 27, 2021

(86) PCT No.: PCT/JP2021/027689
§ 371 (c)(1),
(2) Date: Feb. 24, 2023

(87) PCT Pub. No.: WO2022/049928
PCT Pub. Date: Mar. 10, 2022

(65) Prior Publication Data
US 2023/0294631 A1  Sep. 21, 2023

(30) Foreign Application Priority Data

Sep. 1, 2020 (JP) .................................. 2020-146937

(51) Int. Cl.
*B60R 21/2165* (2011.01)
*B60R 21/203* (2006.01)
*B60R 21/217* (2011.01)

(52) U.S. Cl.
CPC ...... *B60R 21/21656* (2013.01); *B60R 21/203* (2013.01); *B60R 21/217* (2013.01)

(58) Field of Classification Search
CPC ........................... B60R 21/231; B60R 21/203
See application file for complete search history.

(56) References Cited

U.S. PATENT DOCUMENTS

| | | | | |
|---|---|---|---|---|
| 2011/0115202 A1* | 5/2011 | Hiruta | ................... | B60R 21/239 280/741 |
| 2012/0193900 A1* | 8/2012 | Naganawa | ............ | B60R 21/231 280/739 |
| 2021/0316688 A1* | 10/2021 | Koizumi | ............. | B60R 21/2346 |

FOREIGN PATENT DOCUMENTS

| | | | | |
|---|---|---|---|---|
| DE | 102017121681 A1 | * | 3/2018 | .......... B60R 21/203 |
| DE | 112021005197 T5 | * | 9/2023 | |
| DE | 202022103381 U1 | * | 11/2023 | .......... B60R 21/203 |
| EP | 2033850 A2 | * | 3/2009 | .......... B60R 21/203 |

(Continued)

*Primary Examiner* — Nicole T Verley
(74) *Attorney, Agent, or Firm* — Foley & Lardner LLP

(57) ABSTRACT

A driver seat airbag device includes an airbag cushion installed at a center portion 108 of a steering wheel of a vehicle which is configured to expand and deploy toward an occupant in a driver seat; and an inflator that supplies gas to the airbag cushion. The airbag cushion includes a steering side panel provided on the steering wheel side and an occupant side panel joined to the occupant side of the steering side panel. The shape of the expanded and deployed airbag cushion is such that the portion, which is the largest area of the cross section orthogonal to the axis of rotation of the steering wheel, is formed further toward the front side of the vehicle than the center portion between the frontmost portion of the steering side panel and the rearmost portion of the occupant side panel.

5 Claims, 4 Drawing Sheets

(56) References Cited

FOREIGN PATENT DOCUMENTS

| | | | | |
|---|---|---|---|---|
| JP | 2011-126307 | A | 6/2011 | |
| JP | 2012153340 | A * | 8/2012 | ........... B60R 21/231 |
| JP | 2013-71677 | A | 4/2013 | |
| JP | 2013071677 | A * | 4/2013 | |
| JP | 2016-141279 | A | 8/2016 | |
| JP | 2017-159775 | A | 9/2017 | |
| JP | 2018075970 | A * | 5/2018 | |
| JP | 2018122844 | A * | 8/2018 | ........... B60R 21/203 |
| JP | 2018203213 | A * | 12/2018 | |
| JP | 2019038399 | A * | 3/2019 | |
| JP | 2021-49908 | A | 4/2021 | |
| JP | 2021049908 | A * | 4/2021 | |
| JP | 6984563 | B2 * | 12/2021 | |
| KR | 20090020308 | A * | 2/2009 | |
| WO | WO-2011074423 | A1 * | 6/2011 | ......... B60R 21/2346 |
| WO | 2018/084479 | A1 | 5/2018 | |
| WO | WO-2021053982 | A1 * | 3/2021 | ........... B60R 21/203 |
| WO | WO-2023030803 | A1 * | 3/2023 | ........... B60R 21/203 |

\* cited by examiner

FIG. 1
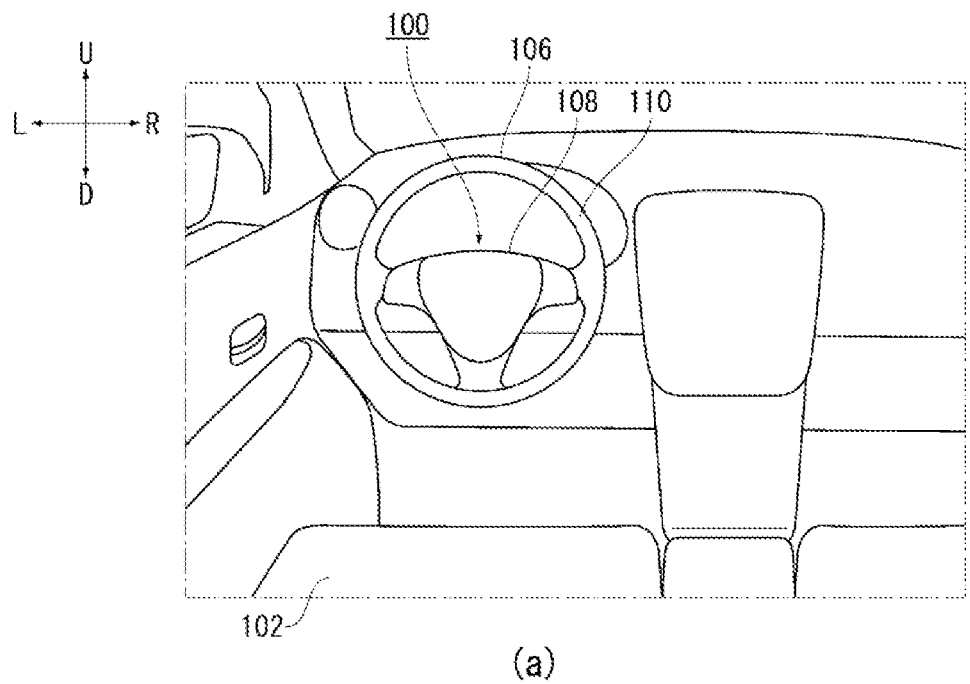
(a)
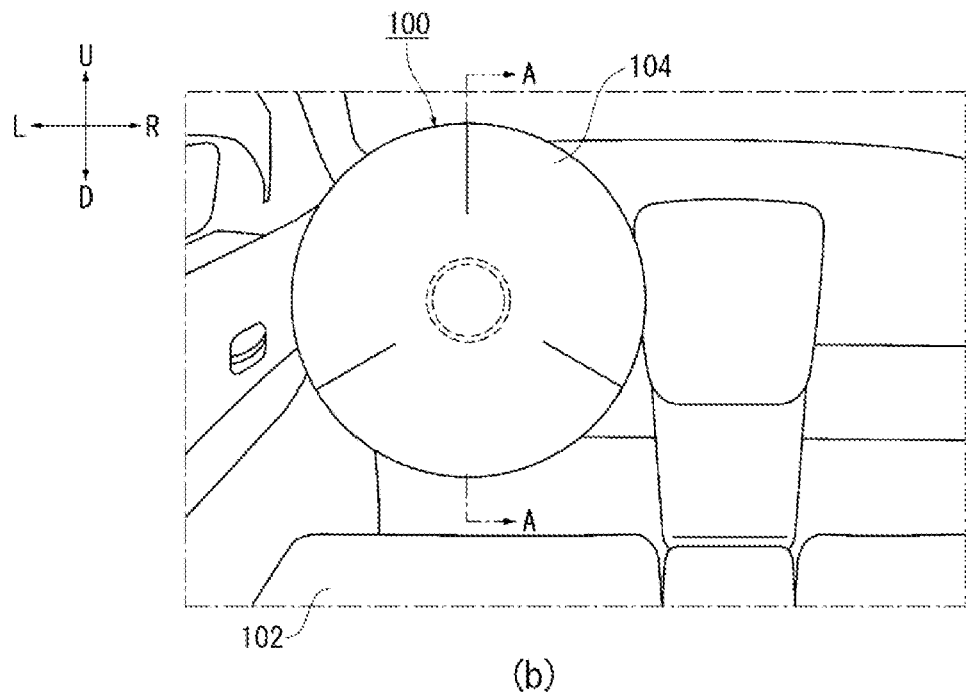
(b)

FIG. 3
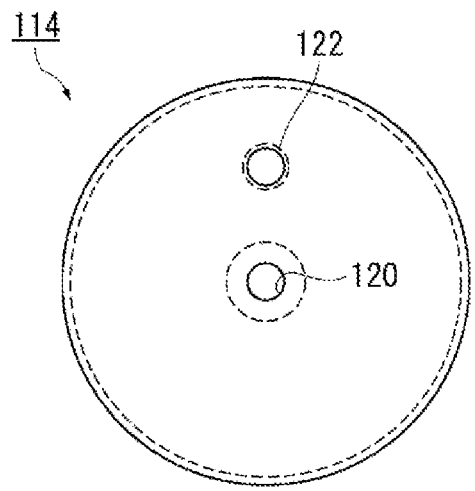
(a)
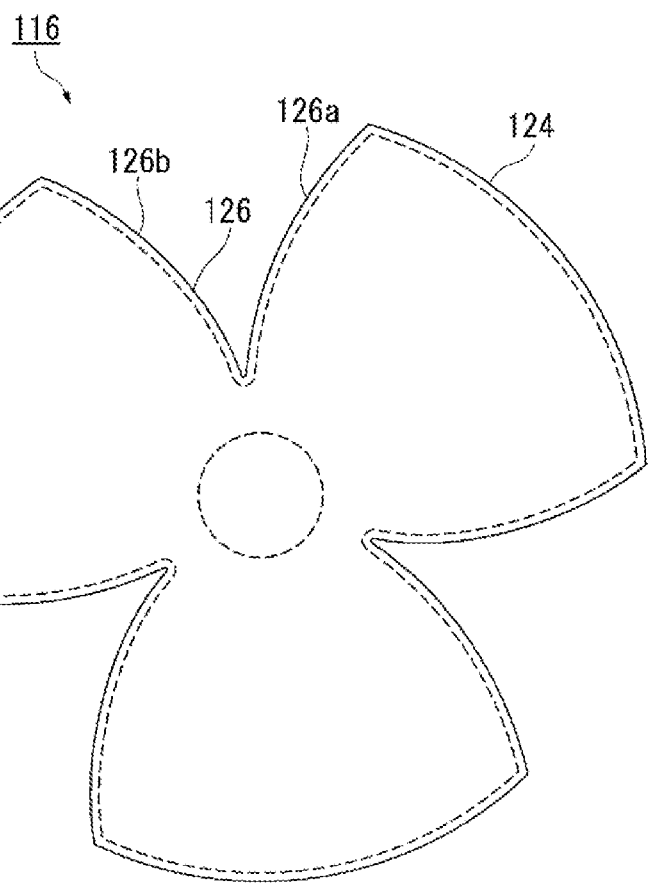
(b)

FIG. 4
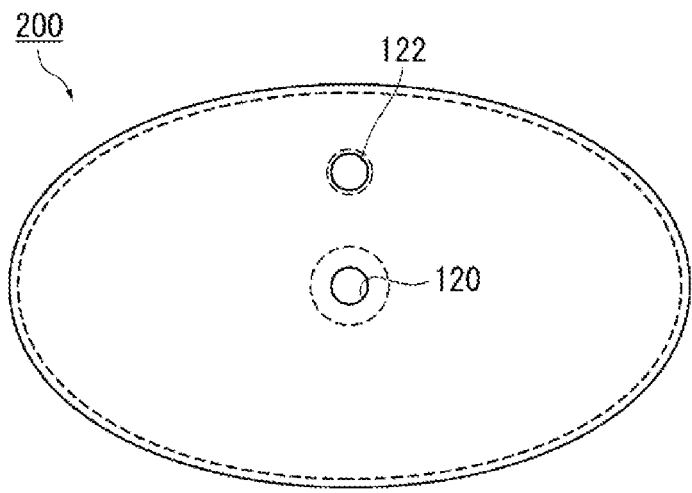
(a)
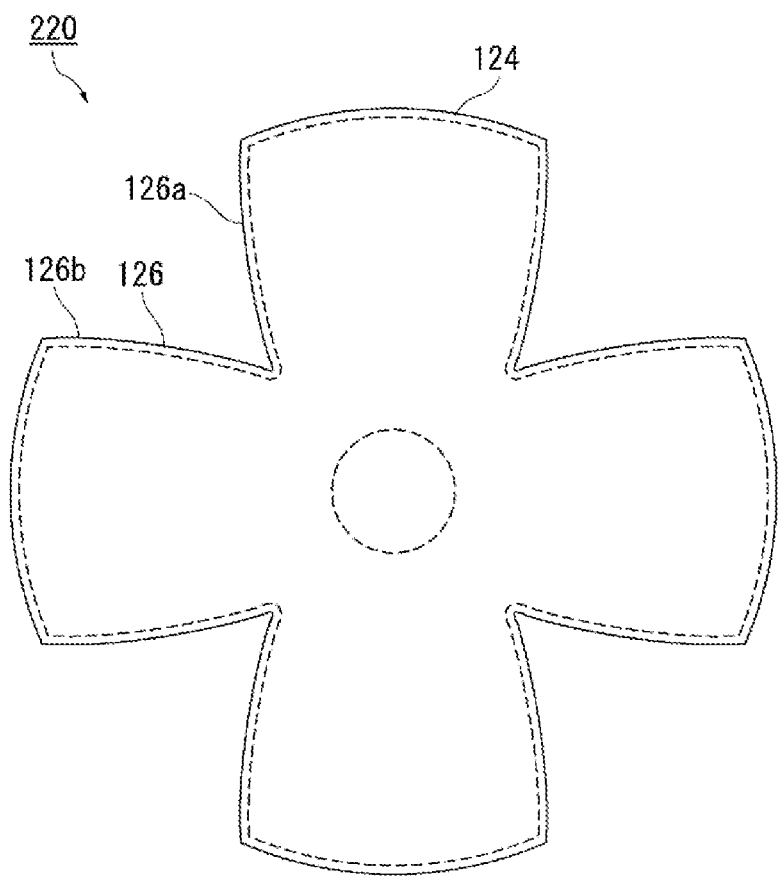
(b)

DRIVERSEAT AIRBAG DEVICE

TECHNICAL FIELD

The present invention relates to a driver seat airbag device having an airbag cushion that is installed in a center portion of a steering wheel of a vehicle, and expands and deploys toward the driver seat occupant.

BACKGROUND ART

Currently, nearly all vehicle steering wheels are equipped with a driver seat airbag device. The airbag cushion of the driver seat airbag device is primarily stored in the center hub of the steering wheel, and expands and deploys in front of the occupant by opening a plastic cover member or the like by the expansion pressure of the cushion.

Current airbag cushions are shaped based on the conditions of a collision and surrounding structures in order to efficiently restrain occupants. For example, in the driver seat airbag device 10 disclosed in Patent Document 1, the shape of the airbag 40 is configured such that an expanded diameter C on an occupant side is larger than an expanded diameter A on a steering wheel side. Since the expanded diameter A of the airbag 40 is reduced and the expanded diameter C of the airbag 40 on the occupant side is increased, the airbag 40 can make broad contact with an occupant who is about to move obliquely forward at the time of a collision in an oblique direction, while suppressing an increase in the overall volume.

RELATED ART DOCUMENTS

Patent Documents

Patent Document 1: Japanese Unexamined Patent Application 2016-141279

SUMMARY OF THE INVENTION

In the configuration of Patent Document 1, as illustrated in FIG. 2, a space β is ensured between the airbag 40 and a wheel portion 22 which is a rim of the steering wheel 20 so that the airbag 40 can rock when the occupant is restrained. However, if the space β is ensured, there is a concern that the time from when the occupant comes into contact with the airbag 40 until movement of the airbag 40 reaches the bottom and a reaction force is obtained from the steering wheel 20 may be longer. In order for the airbag cushion to efficiently restrain the occupant, it is desirable to obtain a reaction force from the steering wheel at an early stage.

Problem to be Solved by the Invention

In light of these issues, an object of the present invention is to provide a driver seat airbag device capable of efficiently restraining an occupant.

Means to Solve the Problem

In order to resolve the aforementioned problems, a typical configuration of a driver seat airbag device is a driver seat airbag device, comprising: an airbag cushion installed at a center portion of a steering wheel of a vehicle and configured to expand and deploy toward an occupant in a driver seat; and an inflator configured to supply gas to the airbag cushion; wherein the driver seat airbag cushion includes:
a steering side panel provided on the steering wheel side; and
an occupant side panel joined to an occupant side of the steering-side panel;
a shape of the expanded and deployed airbag cushion is such that a portion of the airbag cushion having a maximum area in a cross section orthogonal to a rotation axis of the steering wheel is formed further toward a vehicle front side than the center between a frontmost portion of the steering side panel and a rearmost portion of the occupant side panel in a vehicle front-rear direction.

The airbag cushion having the above-described configuration has a large diameter on the steering wheel side, and has a shape protruding convexly from the steering wheel side toward the occupant side. With the airbag cushion having this configuration, it is possible to obtain a reaction force at an early stage by contacting the occupant at an early stage and contacting the steering wheel over a broad area. Furthermore, with the configuration described above, it is possible to obtain a large stroke (movement) from when the occupant comes into contact with the airbag cushion to when the occupant is stopped, while suppressing an increase in the capacity of the airbag cushion; therefore, the occupant can be efficiently restrained while the load applied to the occupant is reduced.

The sewn portion joining the steering side panel and the occupant side panel may be formed further toward the vehicle front side than the center between the frontmost portion of the steering side panel and the rearmost portion of the occupant side panel in the front-rear direction of the vehicle. With this configuration as well, it is possible to achieve an airbag cushion having a shape in which the diameter on the steering wheel side is large and where the airbag cushion convexly protrudes from the steering wheel side toward the occupant side.

The steering side panel may be provided so as to contact the occupant side surface of the steering wheel when the airbag cushion is expanded and deployed. With this configuration, the airbag cushion can be brought into contact with the steering wheel over a broad area to quickly achieve the reaction force.

The steering side panel may be circular or elliptical, having an area that can encompass the rim of the steering wheel when extended on a plane; and the occupant side panel may be dome-shaped and joined to an edge of the steering side panel. With this configuration as well, it is possible to suitably achieve an airbag cushion having a shape in which the diameter on the steering wheel side is large and where the airbag cushion convexly protrudes from the steering wheel side toward the occupant side.

The occupant side panel may be in a state in which one or a plurality of tapered cutouts are formed from an outer periphery toward a center when the occupant side panel is spread on a plane, and
the passenger side panel is formed as a dome by closing the cutouts. Depending on the configuration, it is possible to suitably achieve an airbag cushion having a shape in which the diameter on the steering wheel side is large and where the airbag cushion convexly protrudes from the steering wheel side toward the occupant side.

The side edges of the cutout can be convexly curved with respect to each other. The dome-shaped occupant side panel can be suitably formed by mutually joining the side edges of the convexly curved cutouts.

Effect of the Invention

The present invention can provide a driver seat airbag device capable of efficiently restraining an occupant.

BRIEF DESCRIPTION OF THE DRAWINGS

FIG. 1 is a diagram illustrating an overview of a driver's seat airbag device in accordance with an embodiment of the present invention.

FIG. 3 is a diagram illustrating an example of the panels of the airbag cushion of FIG. 2(b).

FIG. 4 illustrates variations of the steering side panel and the occupant side panel shown in FIG. 3.

DESCRIPTION OF THE PREFERRED EMBODIMENTS

Figure 2:
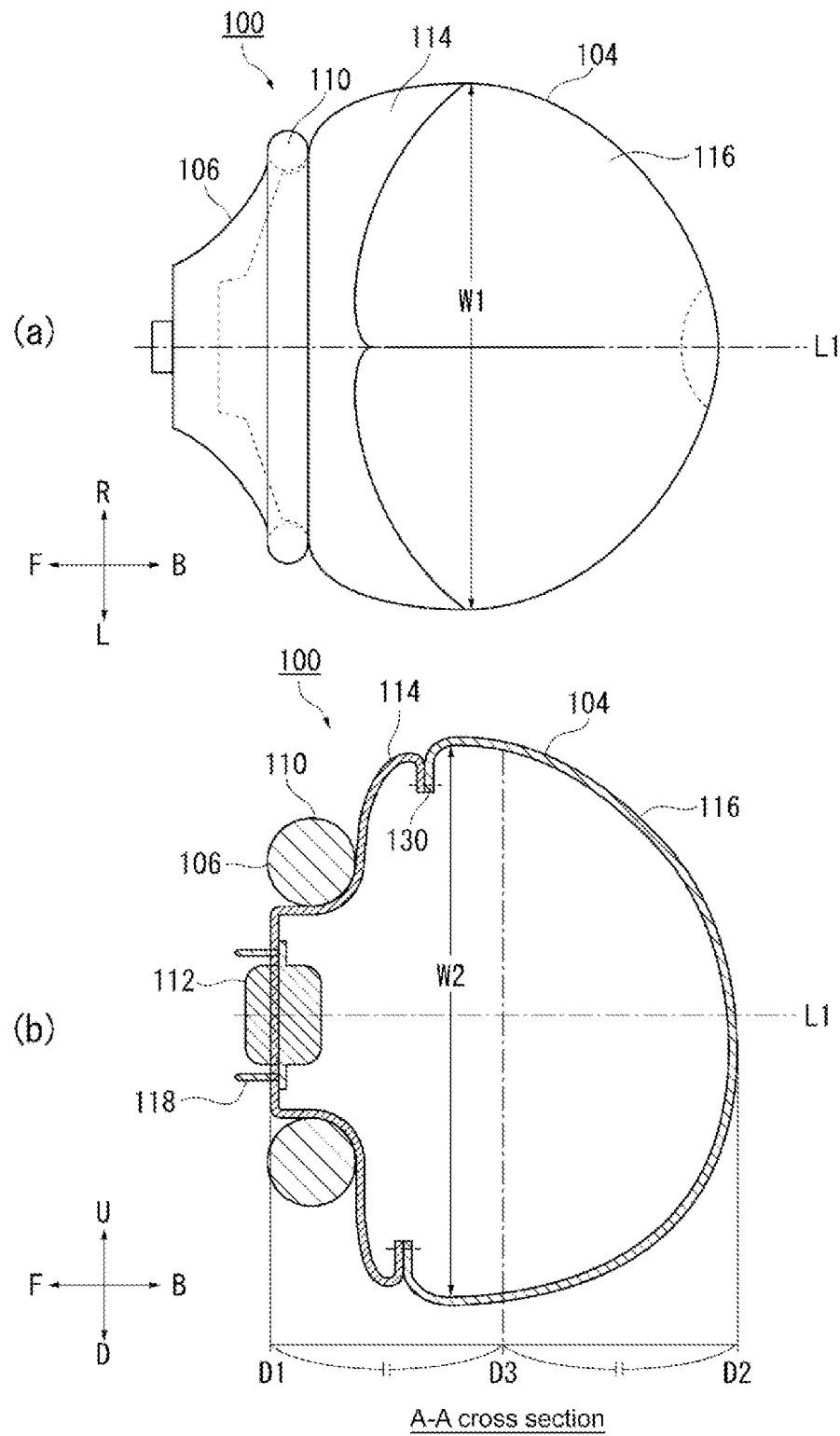
FIG. 2 is a diagram illustrating a configuration of the airbag cushion in FIG. 1(b) after expanding and deploying.

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram illustrating an overview of a driver's seat airbag device 100 according to an embodiment of the present invention. FIG. 1 (a) is a diagram illustrating a state of the driver seat airbag device 100 before activation. Hereinafter, regarding FIG. 1 and other diagrams, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

The driver's seat airbag device 100 is applied in the present embodiment as the driver airbag for the driver's seat for vehicles with a steering wheel on a left side 102 (front row left side seat). Hereinafter, descriptions are made assuming a left side driver seat 102, for example, the outer side in the vehicle width direction (hereinafter, outer vehicle side) refers to the left side of the vehicle, and the inner side in the vehicle width direction (hereinafter, inner vehicle side) refers to the right side of the vehicle.

An airbag cushion 104 (see FIG. 1 (b)) of the driver seat airbag device 100 is folded, rolled, or the like in a predetermined stowage configuration, and stowed inside the center portion 108 of the steering wheel 106 in front of the occupant's regular seating position in the driver seat 102.

FIG. 1 (b) is a diagram illustrating a state of the driver seat airbag device 100 after activation. The airbag cushion 104 begins to expand due to gas from the inflator 112 (see FIG. 2 (b)), opening the cover at the center portion 108 of the steering wheel 106 (see FIG. 1 (a)).

The airbag cushion 104 expands and deploys in a bag shape between the steering wheel 106 and an occupant in a regular seating position in the driver seat 102, to restrain the upper body and head of the occupant from moving forward. The cushion 104 has an essentially circular shape as viewed from the seating position of the occupant, and is formed by overlaying a plurality of panels that constitute the surface thereof and then stitching or adhering.

FIG. 2 is a diagram illustrating a configuration of the airbag cushion 104 in FIG. 1(b) after expanding and deploying. FIG. 2(a) is a diagram illustrating the airbag cushion 104 in FIG. 1(b), as viewed from above. The airbag cushion 104 of the present embodiment is expanded and deployed in a rounded shape protruding from the steering wheel 106 toward the occupant in the driver's seat 102 (see FIG. 1 b).

The airbag cushion 104 is formed from a plurality of panels, and is configured to include a steering side panel 114 arranged on the steering wheel 106 side and an occupant side panel 116 joined to the occupant side of the steering side panel 114.

FIG. 2(b) is a cross-sectional view of the airbag cushion 104 of FIG. 1(b) along line A-A. The airbag cushion 104 when expanded and deployed has a shape in which the diameter on the steering wheel 106 side is large, and convexly protrudes from the steering wheel 106 side toward the occupant side of the driver seat 102 (see FIG. 1(b)). At this time, the steering side panel 114 is supported from the front by a rim 110 of the steering wheel 106, and the occupant side panel 116 is joined to the edge of the steering side panel 114 and has a dome shape.

In particular, the steering side panel 114 may be provided so as to contact the occupant side surface, including the rim 110 or the like of the steering wheel 106 when the airbag cushion 104 is expanded and deployed. With this configuration, the airbag cushion 104 contacts the steering wheel 106 over a broad area to quickly achieve the reaction force.

The inflator 112 is a device for supplying gas, and in the present embodiment, a disk type is used. The inflator 112 is installed inside the central portion 108 of the steering wheel 106 (see FIG. 1(a)) with a portion inserted into the airbag cushion 104 from the steering side panel 114, and the terminals (not shown) exposed to the outside from the steering side panel 114. The inflator 112 is operated upon receiving a detection signal of an impact from a sensor (not illustrated), so as to supply gas to the airbag cushion 104.

The inflator 112 is provided with a plurality of stud bolts 118. The stud bolts 118 pass through the steering side panel 114 in order to fasten to the middle of the bottom of the center portion 108 of the steering wheel 106 (see FIG. 1 (a)). By fastening the stud bolts 118, the airbag cushion 104 is secured to the steering wheel 106.

Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any type of inflator can be used as the inflator 112.

FIG. 3 is a diagram illustrating an example of the panels of the airbag cushion 104 of FIG. 2(b). FIG. 3 (a) is a diagram illustrating the steering side panel 114 of FIG. 2(b) on a plane. The steering side panel 114 of the present embodiment is circular when spread out on a plane, and has an opening 120 in the center for inserting the inflator 112 (see FIG. 2(b)). In addition, a vent hole 122 is provided above the opening 120 to vent the gas to the outside of the airbag cushion 104.

The circular steering side panel 114 has an area large enough to encompass the rim 110 of the steering wheel 106 (see FIG. 1(a)) when spread out on a plane. This configuration enables the expanded and deployed airbag cushion 104 to contact the steering wheel 106 through the steering side panel 114 without excess contact, to achieve an early reaction force.

FIG. 3(b) is a diagram illustrating the occupant side panel 116 of FIG. 2(b) when spread on a plane. The occupant side panel 116 is dome-shaped when forming the airbag cushion 104 (FIG. 2(b)), but can be unstitched and unfolded into a flower-like shape.

To elaborate on the shape of the occupant side panel 116, when spread out on a plane, three tapered cutouts 126 are formed from the curved periphery 124 toward the center. The occupant side panel 116 is made to be dome-shaped (see FIG. 2(b)) by closing the cutouts 126 and joining by sewing or other means.

The side edges 126a and 126b of the cutouts 126 in the occupant side panel 116 are convexly curved toward each other. The occupant side panel 116 can be suitably domed (see FIG. 2(b)) by joining together the side edges 126a and 126b of the convexly curved cutouts 126.

As in the example of FIG. 2(a), the airbag cushion 104 of the present embodiment is expanded and deployed in a shape protruding from the steering wheel 106 toward the occupant in the driver's seat 102 (see FIG. 1(b)). In detail, as illustrated in FIG. 2(b), the shape of the airbag cushion 104 when expanded and deployed is such that the portion W2 with the largest area of the cross-section orthogonal to the axis of rotation L1 of the steering wheel 106 in the airbag cushion 104, is formed further toward the front side of the vehicle than the center portion D3 between the frontmost portion D1 of the steering side panel 114 in the front-rear direction of the vehicle and the rearmost portion D2 of the occupant side panel 116. Furthermore, any cross-section W1 (see FIG. 2(a)) perpendicular to the axis of rotation L1 of the steering wheel 106 gradually decreases from the portion W2 with the largest area of the cross-section to the driver seat 102.

Furthermore, the sewn portion 130 of the airbag cushion 104 that joins the steering side panel 114 and the occupant side panel 116 is formed further toward the front side of the vehicle than the center portion D3 described above. With this configuration as well, the airbag cushion 104 has a shape in which the diameter on the steering wheel 106 side is large and convexly protrudes from the steering wheel side toward the occupant side.

The airbag cushion 104 having the above-described shape protrudes toward the occupant side, and can contact the occupant at an early stage. In addition, the diameter on the steering wheel 106 side is large; therefore, it is possible to achieve a reaction force early by widely contacting with the steering wheel 106. Furthermore, in the driver seat airbag device 100, the size of the airbag cushion 104 along the axis of rotation L1 (see FIG. 2(a)) is increased while suppressing an increase in the volume of the airbag cushion 104; therefore, it is possible to obtain a large stroke (amount of movement) from the moment the occupant comes into contact with the airbag cushion 104 until the occupant stops; thus, it is possible to efficiently restrain the occupant while reducing the load that may be applied to the occupant.

Modified Example

Modified examples of each of the above-described components are described below. In FIG. 4, the same symbols are attached to the same structural elements as those described above, and a description of the aforementioned structural elements is omitted. In the following description, components having the same name as a component already described are assumed to have the same function unless otherwise specified, even if marked with a different sign.

FIG. 4 illustrates modified examples of the steering side panel 114 and the occupant side panel 116 illustrated in FIG. 3. FIG. 4(a) illustrates a modified example (steering side panel 200) of the steering side panel 114 in FIG. 3(a). The steering side panel 200 is elliptical in shape. The elliptical steering side panel 200 is also increased in area to an extent that the rim 110 (see FIG. 1(a)) of the steering wheel 106 can be encompassed therein; therefore, a reaction force can be efficiently achieved from the steering wheel 106 when the airbag cushion 104 is expanded and deployed.

FIG. 4(b) is a modified example of the occupant side panel 116 in FIG. 3(b) (occupant side panel 220). The occupant side panel 220 has four cutouts 126. The occupant side panel 220 can also be suitably domed (see FIG. 2(b)) by joining together the side edges 126a and 126b of the cutouts 126. As described above, the number of the cutouts 126 provided in the occupant side panel is not limited, and a larger number of cutouts 126 may be provided, or a dome-shaped occupant side panel can be achieved by providing only one cutout 126.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as a driver seat airbag device having an airbag cushion that is installed in a center portion of a steering wheel of a vehicle, and expands and deploys toward the driver seat occupant.

EXPLANATION OF CODES

100. Driver seat airbag device; 102. Driver seat; 104. Airbag cushion; 106. Steering wheel; 108. Center portion; 110. Rim; 112. Inflator; 114. Steering side panel; 116. Occupant side panel; 118. Stud bolt; 120. Opening; 122. Vent hole; 124. Outer periphery; 126. Cutout; 126a, 126b. Side edge of cutout; 130. Sewn portion; D1. Frontmost portion of steering side panel; D2. Rearmost portion of occupant side panel; D3. Center portion; L1. Rotation axis; W1. Cross-section; W2. Portion of cross-section with maximum area; 200. Steering side panel of modified example; 220. Occupant-side panel of modified example

The invention claimed is:
1. A driver seat airbag device, comprising: an airbag cushion installed at a center portion of a steering wheel of a vehicle and configured to expand and deploy toward an occupant in a driver seat; and an inflator configured to supply gas to the airbag cushion; wherein the driver seat airbag cushion includes:
- a steering side panel provided on the steering wheel side; and
- an occupant side panel joined to an occupant side of the steering-side panel; and a shape of the expanded and deployed airbag cushion is such that a portion of the airbag cushion having a maximum area in a cross section orthogonal to a rotation axis of the steering wheel is formed further toward the vehicle front side than the center between a frontmost portion of the steering side panel and a rearmost portion of the occupant side panel in a vehicle front-rear direction,
- wherein the steering side panel is circular or elliptical, having an area that can encompass the rim of the steering wheel when extended on a plane, and the occupant side panel is dome-shaped and joined to an edge of the steering side panel,
- wherein the occupant side panel is in a state in which one or a plurality of tapered cutouts are formed from an outer periphery toward a center when the occupant-side panel is spread on a plane, and
- wherein the passenger side panel is formed as a dome by closing the cutouts.

2. The driver seat airbag device according to claim 1, wherein a sewn portion joining the steering side panel and the occupant side panel is formed further towards the front of the vehicle than the center between the frontmost portion of the steering side panel and the rearmost portion of the occupant side panel in the front-rear direction of the vehicle.

3. The driver seat airbag device according to claim 1, wherein the steering side panel is provided so as to contact an occupant side surface of the steering wheel when the airbag cushion is expanded and deployed.

4. The driver seat airbag device according to claim 2, wherein the steering side panel is provided so as to contact an occupant side surface of the steering wheel when the airbag cushion is expanded and deployed.

5. The driver seat airbag device according to claim 1, wherein the side edges of the cutouts are convexly curved with respect to each other.

* * * * *